United States Patent

[11] 3,572,567

[72] Inventor Hermann Claar
 Stuttgart-Wangen, Germany
[21] Appl. No. 750,518
[22] Filed Aug. 6, 1968
[45] Patented Mar. 30, 1971
[73] Assignee Eastman Kodak Company
 Rochester, N.Y.
[32] Priority Aug. 12, 1967
[33] Germany
[31] K63088

[54] CAM MECHANISM FOR THE FILM-ADVANCING SYSTEM IN A CINEMATOGRAPHIC DEVICE
2 Claims, 1 Drawing Fig.
[52] U.S. Cl. ................................................ 226/67, 352/194
[51] Int. Cl. ................................................ G03b 1/22
[50] Field of Search ........................................ 352/191, 194; 226/62—73

[56] References Cited
UNITED STATES PATENTS
2,106,115 1/1938 Debrie .................... 352/194
2,484,348 10/1949 Kellogg .................... 226/65

Primary Examiner—Richard A. Schacher
Attorneys—Robert W. Hampton and James A. Smith ABSTRACT: A mechanism for controlling the motion of a pulldown claw in a cinematographic device operates throughout its entire cycle under approximately constant torque requirements of the drive motor of the device. The mechanism includes two opposed cam followers which ride on two cam surfaces respectively of a cam means. Each cam surface and follower has a particular shape and orientation relative to the other cam surface and follower such that the torque required to drive the pulldown claw remains approximately constant throughout each 360° of rotation of the cam.

Patented March 30, 1971 3,572,567
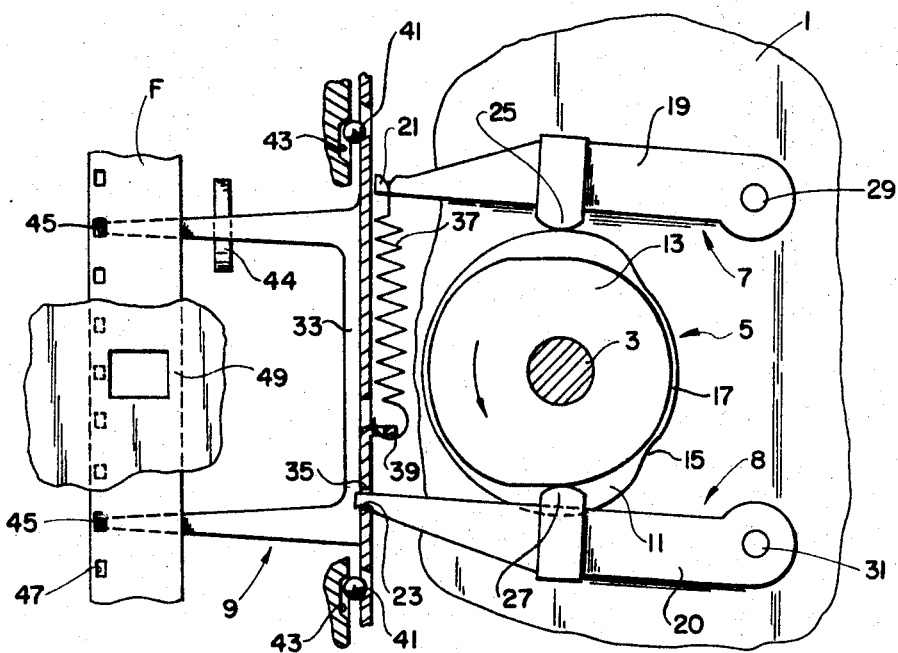
HERMANN CLAAR
INVENTOR.
BY *James A. Smith*
*Robert W. Hampton*
ATTORNEYS

CAM MECHANISM FOR THE FILM-ADVANCING SYSTEM IN A CINEMATOGRAPHIC DEVICE

BACKGROUND OF THE INVENTION

1. Field of the Invention

The present invention relates to mechanisms for intermittently advancing film through cinematographic devices such as motion picture projectors, cameras, or the like, and more particularly to a mechanism for controlling the up-and-down motion of a pulldown claw in the film-advancing system of a motion picture projector.

2. Description of the Prior Art

It is well known in motion picture apparatus to intermittently advance perforated film past a projection aperture or gate by means of a pulldown claw. The claw may be mounted on the projector for sliding movement in an up-and-down direction parallel to the direction of film advance, and for movement in an in-and-out direction perpendicular to the direction of film advance. In-and-out movement of the claw causes the film-engaging portion thereof to enter and retract from the film perforations while the up-and-down movement of the claw effects the intermittent frame-by-frame advance of the film.

These movements of the claw may be effected, for example, by eccentric up-and-down and in-and-out cam means which are often mounted on a motor-driven shaft of the projector which also may be arranged to drive the projector shutter. In one form of such mechanisms a portion of the pulldown claw, or an arm extending therefrom, rides on the up-and-down cam surface under the influence of one or more return springs. During a first 180° of rotation of the cam means, the claw is advanced in one direction and the return spring is tensioned, while during a second 180° of rotation of the cam means, the return spring relaxes and returns the pulldown claw to its original position.

Such cam- and spring-actuated operation of the claw produces periodically varying torques and load conditions which act on the projector drive motor and other projector mechanisms and which adversely affect the useful life thereof. Moreover, the drive motor must have an output torque rating large enough to handle the maximum torque requirements of the projector which occur upon tensioning of the return spring particularly during initial energization of the projector motor. Such maximum torque requirements compel the use of a motor having a rating which substantially exceeds the load during other portions of the pulldown cycle.

Another known method of controlling the movement of the pulldown claw eliminates the need for a return spring. For example, in the Kodak Instamatic M 70 motion picture projector an up-and-down cam is eccentrically mounted for rotation to transmit an up-and-down motion to a cam follower. The follower is of the box type having upper and lower opposed sides which ride on the uppermost and lowermost points on the cam surface. The cam causes the follower and the claw to reciprocate in both directions and, therefore, the return spring becomes unnecessary. However, because the cam in this projector is mounted for rotation about an eccentric axis, and the uppermost and lowermost points at which the follower engages the cam surface shift from side to side about this eccentric axis, the torque required to drive the mechanism will vary greatly throughout the operating cycle of the mechanism with the same disadvantages as set forth above.

SUMMARY OF THE INVENTION

An object of the present invention is to drive a pulldown mechanism by means of the cam and follower means which operates under substantially constant torque conditions.

In a preferred embodiment of the invention, up-and-down movement of a film pulldown claw is effected by two cam surfaces which are mounted for rotation concentrically but 180° out of phase. The cam surfaces respectively drive two opposed cam followers which are operatively connected to the pulldown claw and which are mounted on the projector to engage the cam surfaces at positions on opposite sides of the axis of rotation of the cam surfaces and substantially on a line extending through said axis, regardless of the angular position of the cam surfaces.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying. The drawing, which is a schematic view of a drive mechanism in accordance with the present invention, illustrating two up-and-down cam surfaces and the two opposed followers operatively connected to the pulldown claw.

DESCRIPTION OF THE PREFERRED EMBODIMENT

Because certain parts of cinematographic and related apparatus are well known, the following description is directed in particular to those elements forming, or cooperating directly with, the present invention, elements that are not specifically shown or described herein being understood to be selectable from those known in the art.

Referring now to the drawing, the preferred embodiment of the invention generally includes a projector (or camera) housing or support structure represented by wall 1, a rotatable drive member or shaft 3 operatively connected to the projector drive motor (not shown), a motion-translating means in the form of a cam 5 and a pair of cam followers 7 and 8 for converting the rotary motion of the drive member 3 into reciprocating motion, and a film pulldown claw 9 operatively connected to the cam followers 7 and 8 and adapted to engage and intermittently advance film through the projector.

Drive member 3 may be rotatably driven by the projector motor (not shown) and further may be arranged to rotatably drive the projector shutter (not shown). Since this portion of the system is well known to those skilled in the art, a specific disclosure thereof is deemed unnecessary.

Cam 5 is supported on drive member 3 for rotation therewith and comprises two disc-shaped members 11 and 13 defining outer cam surfaces 15 and 17, respectively. For a purpose to become more fully apparent hereinafter, each disc-shaped member is mounted on drive member 3 with its axis of rotation concentric with the axis of rotation of the drive member. Thus, the disc-shaped members are mounted concentrically with each other and also with the drive member. Moreover, the rise and fall portions of cam surfaces 15 and 17 are configured and oriented relative to each other such that a rise in cam surface 15 at any given first location on said surface is matched by a corresponding fall in cam surface 17 at a second location angularly spaced 180° from the first location. While the disc-shaped members have been disclosed as elements of a single unitary cam 5, it should be understood that the members could be individually mounted in much the same manner on member 3, or on separate drives, to form two separate cams.

The followers 7 and 8 comprise arms or levers 19 and 20, having free ends or ears 21 and 23, and having follower portions in the form of protuberances 25 and 27, respectively. In the preferred embodiment disclosed, the arms 19 and 20 are pivotally mounted to the projector at the ends 29 and 31 opposite from the ears 21 and 23, respectively, such that the follower portions 25 and 27 will ride on the corresponding cam surfaces 15 and 17 of the disc-shaped members and the arms 19 and 20 will pivot in response to rotation of said members. For reasons described more fully hereinafter, the arms 19 and 20 are mounted with the followers portions 25 and 27 thereof in engagement with the cam surfaces 15 and 17 at first and second positions angularly spaced about the cam 5 by 180° Moreover, these positions of engagement lie substantially on a line passing through the axis of rotation of the cam regardless of the angular position of the cam.

Arm 20 is operatively connected to the pulldown claw 9 of the projector by means of the ear 23 on arm 20 and a mating recess 35 in the claw. Arm 19, on the other hand, is operatively connected to claw 9 by a spring 37 which extends between ear 21 on arm 19 and a lug 39 on the claw 9. As will become more fully apparent hereinafter, spring 37 maintains a constant tension throughout the operative cycle of the projector and serves to bias arms 19 and 20 against surfaces 15 and 17 with equal but oppositely directed forces.

The claw 9 may be mounted on the projector in a well-known manner by means of balls 41 and recesses 43 to reciprocate in an up-and-down direction and to pivot in an in-and-out direction relative to the direction of film advance. In the embodiment disclosed, such reciprocation of the claw in the up-and-down direction is effected by pivotal motion of the arms 19 and 20. The in-and-out movement, on the other hand, may be accomplished by a suitable cam means which may be of a type well known to those skilled in the art. For example, such an in-and-out cam means may comprise a face cam 44 (schematically shown in the drawing) upon which a portion of the claw 9 rides to guide the film-engaging portions 45 of the claw into perforations 47 during the downward stroke of the claw and to withdraw portions 45 from perforations 47 during the upward or return stroke of the claw. In this manner, film F will be intermittently advanced frame-by-frame past the projector gate 49 for projection in the usual manner.

Referring now generally to the operation of the film-advancing mechanism in accordance with the invention, cam 5 and followers 7 and 8 convert or translate rotary motion of drive member 3 into reciprocative motion of claw so that the load on shaft 3 is substantially constant throughout the operative cycle of the mechanism. As arm 19 rises or falls in response to the contours of cam surface 15, arm 20 falls or rises by an equal but opposite amount under the influence of spring 37 in response to contours on cam surface 17. Thus, any variations in torque in the shaft 3 caused by cyclical displacement of arm 19 are balanced and compensated for by equal and opposite variations in torque caused by cyclical displacement of arm 20. Since the arms 19 and 20 always contact surfaces 15 and 17 of cam 5 at points substantially on a straight line passing through the axis of rotation of the cam, no unbalanced increase or decrease in torque will occur due to the eccentricity of the cams. Arms 19 and 20 move equally and synchronously with a constant spacing therebetween. Accordingly, spring 37 will not increase or decrease in length, and thus will not vary the torque load of the mechanism, as often is the case in known projectors using a return spring for the film claw.

The invention has been described in detail with particular reference to the preferred embodiment thereof, but it will be understood that variations and modifications can be effected within the spirit and scope of the invention.

I claim:

1. A drive mechanism for intermittently advancing film having perforations through a motion picture projector, said mechanism comprising:
   a reciprocatable pulldown claw mounted on the projector for reciprocative movement relative thereto and adapted to engage the film through the perforations to intermittently advance the film;
   first and second pivotable arms mounted on the projector for synchronous pivotal movement relative thereto, said first arm being pivotally connected to said pulldown claw to impart reciprocative movement to said claw in response to pivotal movement of said first arm;
   spring means connecting said second arm to said pulldown claw for biasing said first and second arms toward each other; and
   a rotatable cam member mounted on the projector for rotation about an axis between said first and second arms, said cam member having first and second cam surfaces in contact with said first and second arms, respectively, at diametrically opposite points on a line perpendicular to and intersecting said axis.

2. A mechanism for driving a film-advancing means in a cinematographic device to intermittently advance film through the device, said mechanism comprising:
   rotatable cam means having an axis of rotation and defining a pair of cam surfaces;
   means for rotating said cam means;
   first and second displaceable follower members coupled to the film-advancing means for imparting reciprocative movement to the film-advancing means, said first and second follower members contacting said cam surfaces, respectively, at first and second locations spaced on a line intersecting said axis; whereby rotation of said cam means effects equal and opposite synchronous displacement of said first and second follower members relative to said axis substantially along said line, and said mechanism thereby operates under substantially constant torque conditions, said first follower member being directly connected to the film-advancing means; and
   a spring connecting said second follower member to the film-advancing means so that said spring urges said first and second follower members into contact with said cam surfaces; whereby a variation in torque load on said cam means caused by displacement of said first follower member is compensated for by equal and opposite displacement of said second follower member.